(12) United States Patent
Mizobuchi et al.

(10) Patent No.: US 8,985,871 B2
(45) Date of Patent: Mar. 24, 2015

(54) OPTICAL MODULE

(71) Applicant: Hitachi Cable, Ltd., Tokyo (JP)

(72) Inventors: Kenji Mizobuchi, Hitachi (JP); Ryuta Takahashi, Hitachi (JP)

(73) Assignee: Hitachi Metals, Ltd, Tokyo (JP)

( * ) Notice: Subject to any disclaimer, the term of this patent is extended or adjusted under 35 U.S.C. 154(b) by 107 days.

(21) Appl. No.: 13/672,934

(22) Filed: Nov. 9, 2012

(65) Prior Publication Data

US 2013/0121650 A1 May 16, 2013

(30) Foreign Application Priority Data

Nov. 11, 2011 (JP) ................. 2011-248082

(51) Int. Cl.
*G02B 6/36* (2006.01)
*G02B 6/43* (2006.01)
*G02B 6/42* (2006.01)
*H04B 10/00* (2013.01)
*G02B 6/293* (2006.01)

(52) U.S. Cl.
CPC ............... *G02B 6/43* (2013.01); *G02B 6/4215* (2013.01); *G02B 6/4246* (2013.01); *G02B 6/4281* (2013.01); *G02B 6/29362* (2013.01)
USPC ............... 385/89; 385/14; 398/135; 398/138; 398/139

(58) Field of Classification Search
CPC ...... G02B 6/43; G02B 6/4215; G02B 6/4246; G02B 6/4281
See application file for complete search history.

(56) References Cited

U.S. PATENT DOCUMENTS

| | | | | |
|---|---|---|---|---|
| 7,153,043 | B1 * | 12/2006 | Zhang et al. ................. | 385/92 |
| 7,275,937 | B2 * | 10/2007 | Ellison ........................ | 439/67 |
| 7,306,377 | B2 * | 12/2007 | Ellison ........................ | 385/88 |
| 7,309,173 | B2 * | 12/2007 | Epitaux et al. ............... | 385/92 |
| 7,945,169 | B2 * | 5/2011 | Oki et al. ..................... | 398/135 |
| 8,380,073 | B2 * | 2/2013 | Edwards et al. ............. | 398/135 |
| 2005/0244095 | A1 * | 11/2005 | Ellison ........................ | 385/14 |
| 2006/0088255 | A1 * | 4/2006 | Wu et al. ..................... | 385/92 |
| 2009/0052898 | A1 * | 2/2009 | Oki et al. ..................... | 398/79 |
| 2012/0301152 | A1 * | 11/2012 | Edwards et al. ............. | 398/135 |
| 2013/0121650 | A1 * | 5/2013 | Mizobuchi et al. .......... | 385/89 |
| 2013/0121651 | A1 * | 5/2013 | Takahashi et al. ........... | 385/89 |

FOREIGN PATENT DOCUMENTS

| | | |
|---|---|---|
| JP | 2003-501684 | 1/2003 |
| JP | 2005-173043 | 6/2005 |
| JP | 2007-279507 | 10/2007 |
| JP | 2008-203427 | 9/2008 |
| JP | 2009-164324 | 7/2009 |

OTHER PUBLICATIONS

JP Office Action dated Nov. 4, 2014.

\* cited by examiner

*Primary Examiner* — Rhonda Peace

(74) *Attorney, Agent, or Firm* — Roberts Mlotkowski Safran & Cole P.C.

(57) ABSTRACT

An optical module includes a housing, an optical adapter attached to an end portion of the housing, and an optical transmitter and receiver assembly mounted in the housing. The optical transmitter and receiver assembly includes a TOSA including a plurality of light-emitting elements, a ROSA including a light-receiving element, and a circuit board electrically connected to the TOSA and the ROSA. The TOSA further includes a TOSA base having an opposing side surface on which the plurality of light-emitting elements are oppositely arranged so as to form at least one pair. The circuit board includes a first flexible substrate mounting the TOSA and a first rigid substrate connected to the first flexible substrate. The first flexible substrate includes a TOSA base facing-portion facing the TOSA base, and a connection portion extending from both end portions of the TOSA base-facing portion and connected to the plurality of light-emitting elements.

7 Claims, 13 Drawing Sheets

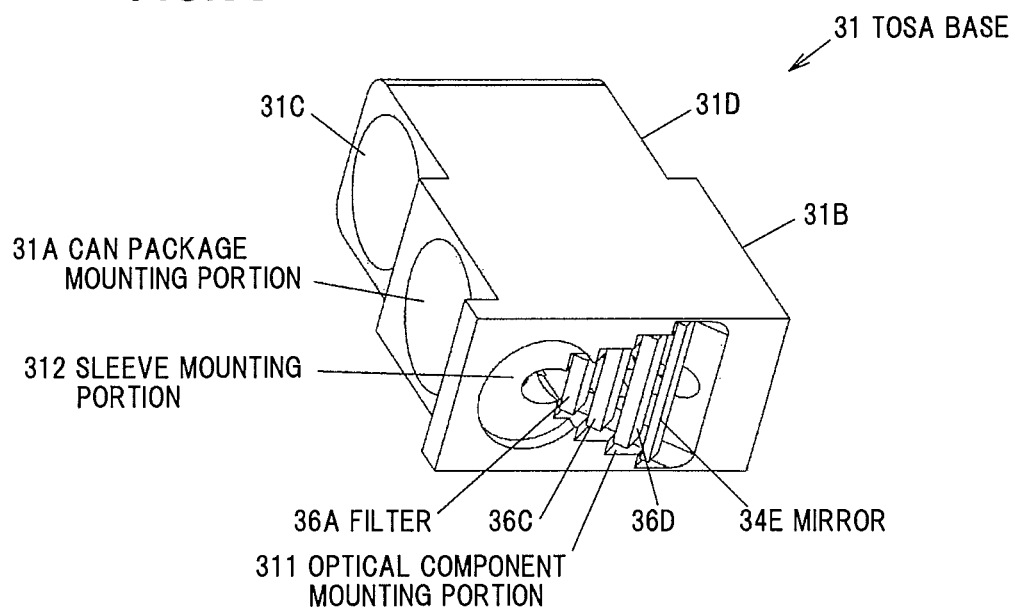
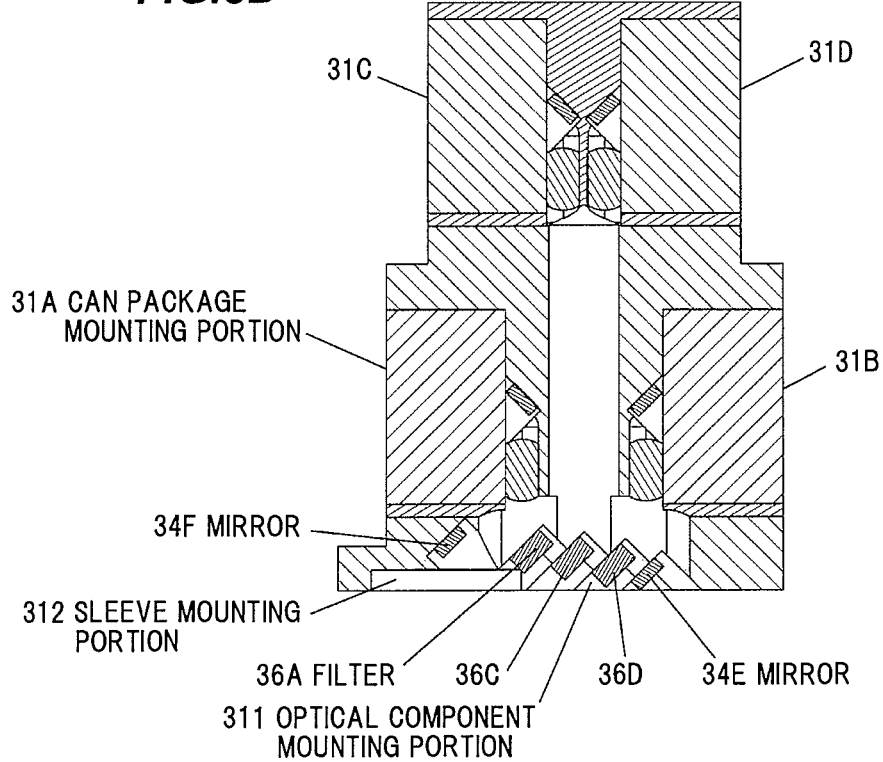

360A FILTER
360C
3110 OPTICAL COMPONENT MOUNTING PORTION
360D
340E MIRROR

3130 OPENING
3110

OPTICAL MODULE

The present application is based on Japanese patent application No. 2011-248082 filed on Nov. 11, 2011, the entire contents of which are incorporated herein by reference.

BACKGROUND OF THE INVENTION

1. Field of the Invention

The invention relates to an optical module and, in particular, to a compact WDM (Wavelength Division Multiplexing) optical module.

2. Description of the Related Art

In recent years, optical modules are demanded to be a wavelength-division multiplexing type. For example, as a transmitter optical sub-assembly (TOSA) used in an optical module to couple optical signals with different wavelengths emitted from plural light sources and to multiplex the wavelengths, a TOSA in which four CAN packages for housing LDs (laser diode) are arranged in a line so as to face the same direction is known (see JP-A-2007-279507 and JP-A-2008-203427).

Meanwhile, in recent years, the optical modules such as optical transceiver are required to be further downsized. There is a need for a compact optical transceiver meeting, e.g., "QSFP+(Quad Small Form-factor Pluggable Plus)" which is a transceiver standard for optical fiber supporting 40 to 100 GbE connection, and especially a WDM compact optical transceiver is demanded.

SUMMARY OF THE INVENTION

However, when a conventional TOSA, e.g., the TOSA described in JP-A-2007-279507, etc., is used in a WDM compact optical transceiver, e.g., one conforming to the QSFP+ standard, a space for horizontally arranging four CAN packages having a predetermined size is required. Since it is not possible to place a substrate in such a portion, a substrate area decreases and high-density packaging of components thus becomes difficult. In addition, since the substrate is horizontally long, it is difficult to vertically arrange components and the components are arranged in a horizontal direction, resulting in poor wiring efficiency. Furthermore, in the compact optical transceiver conforming to the QSFP+ standard which communicates externally using a card edge as an interface, wiring is difficult since a substrate area from an edge to a card edge portion is narrow as a result of downsizing, and if wiring is installed at a narrow pitch in such a case, an effect of crosstalk is a concern.

In other words, it is difficult to use a conventional TOSA in a WDM compact optical transceiver, e.g., one conforming to the QSFP+ standard.

Accordingly, it is an object of the invention to provide an optical module that is constructed such that it allows high-density packaging even in a WDM compact optical transceiver, e.g., one conforming to the QSFP+ standard.

(1) According to one embodiment of the invention, an optical module comprises:
 a housing;
 an optical adapter attached to an end portion of the housing; and
 an optical transmitter and receiver assembly mounted in the housing,
 wherein the optical transmitter and receiver assembly comprises a TOSA comprising a plurality of light-emitting elements for outputting optical signals, a ROSA comprising a light-receiving element for inputting optical signals, and a circuit board electrically connected to the TOSA and the ROSA,
 wherein the TOSA is disposed on a side of the optical adapter in the housing and further comprises a TOSA base having opposing side surfaces on which the plurality of light-emitting elements are oppositely arranged so as to form at least one pair,
 wherein the circuit board comprises a first flexible substrate mounting the TOSA and a first rigid substrate connected to the first flexible substrate, and
 wherein the first flexible substrate comprises a TOSA base facing-portion facing the TOSA base, and a connection portion extending from both end portions of the TOSA base-facing portion and connected to the plurality of light-emitting elements.

In the above embodiment (1) of the invention, the following modifications and changes can be made.

(i) The circuit board has a two-level structure such that an upper level portion comprises the first flexible substrate and the first rigid substrate, and a lower level portion comprises a second rigid substrate that is connected to the first rigid substrate via a connecting flexible substrate.

(ii) The plurality of light-emitting elements are arranged on the TOSA base while being each housed in a CAN package.

(iii) A transmission component is arranged and wired on the first rigid substrate and a reception component is arranged and wired on the second rigid substrate.

(iv) The second flexible substrate mounting the ROSA is connected to the second rigid substrate.

(v) The second rigid substrate comprises an edge connector at an end portion thereof (vi) The TOSA base has a side surface formed into a stairs shape and the light-emitting element is placed on each stair.

EFFECTS OF THE INVENTION

According to one embodiment of the invention, an optical module can be provided that is constructed such that it allows high-density packaging even in a WDM compact optical transceiver, e.g., one conforming to the QSFP+ standard.

BRIEF DESCRIPTION OF THE DRAWINGS

Next, the present invention will be explained in more detail in conjunction with appended drawings, wherein:

FIG. 8C is a perspective view showing the TOSA base of FIG. 8A as viewed from a different direction and FIG. 8D is a cross-sectional top view showing the TOSA base of FIG. 8A;

DETAILED DESCRIPTION OF THE PREFERRED EMBODIMENTS

First Embodiment of the Invention

Structure of Optical Module

Figure 1:
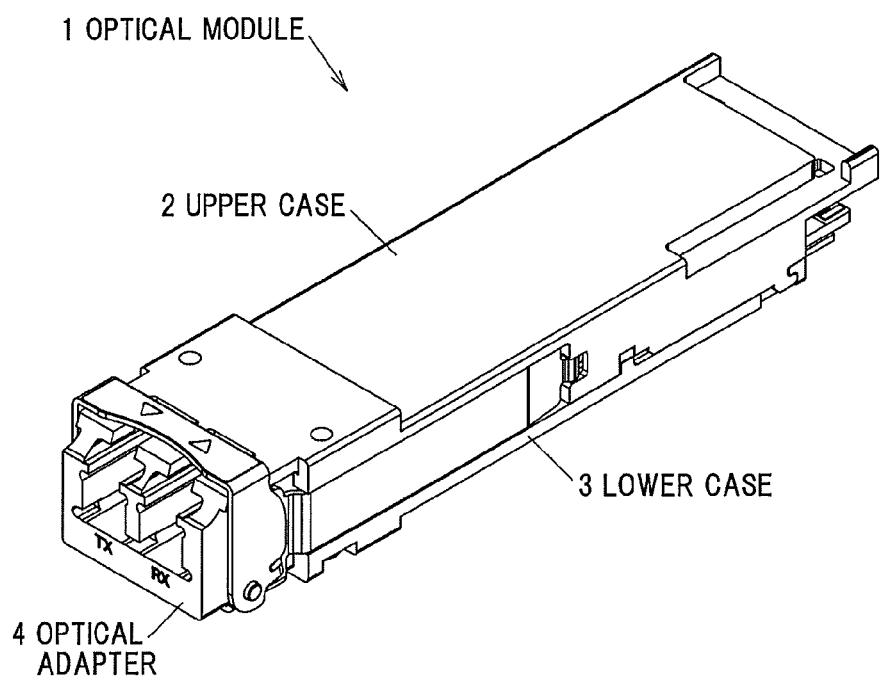
FIG. 1 is a perspective view showing an outer appearance of an optical module in a first embodiment of the present invention.
Figure 2:
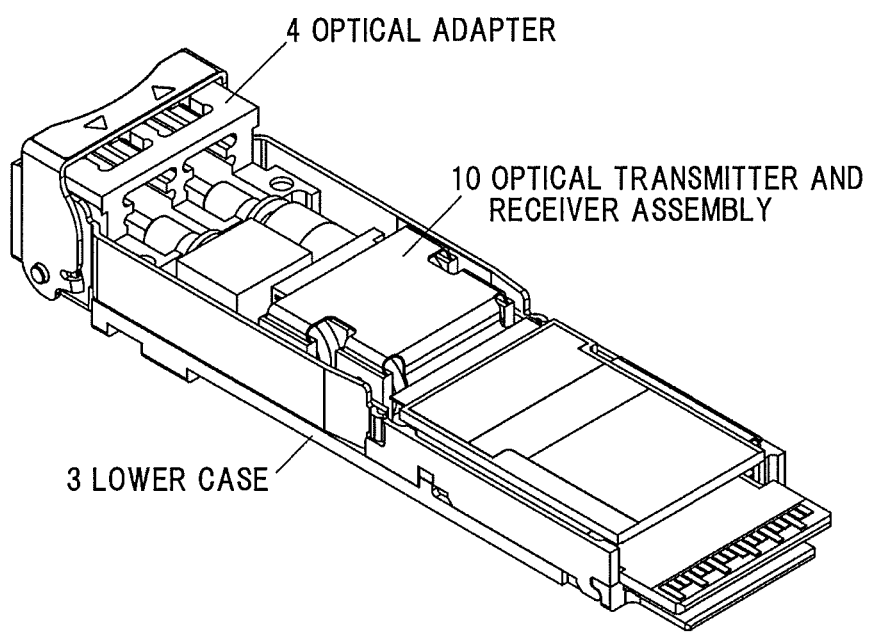
FIG. 2 is a perspective view showing an outer appearance of the optical module in the first embodiment of the invention (in a state that an upper case is removed)

FIG. 1 is a perspective view showing an outer appearance of an optical module in a first embodiment of the invention and FIG. 2 is a perspective view showing an outer appearance of the optical module in the first embodiment of the invention (in a state that an upper case is removed).

An optical module 1 in the first embodiment of the invention is a WDM optical transceiver conforming to QSFP+ standard.

The optical module 1 is provided with an upper case 2 and a lower case 3 which constitute a housing of the optical module 1, an optical adapter 4 attached to the lower case 3 and an optical transmitter and receiver assembly 10 mounted inside the housing.

The upper case 2 and the lower case 3 are formed in a size conforming to QSFP+ standard. The optical adapter 4 is installed at a front end portion of the optical module 1 and has insertion ports (TX: transmission, RX: reception) for inserting optical connectors.

Structure of Optical Transmitter and Receiver Assembly

Figure 3:
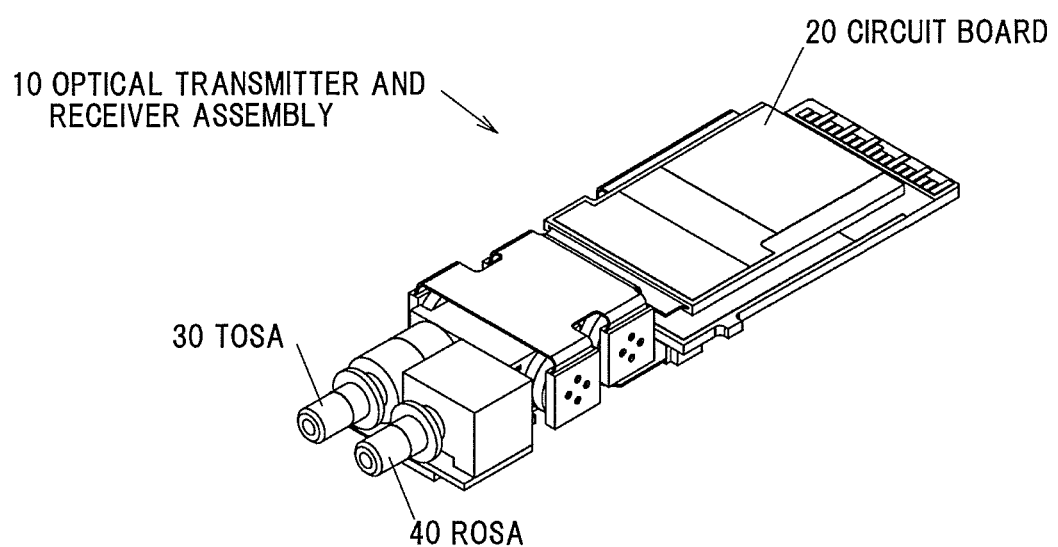
FIG. 3 is a perspective view showing an optical transmitter and receiver assembly used for the optical module in the first embodiment of the invention.
Figure 4A:
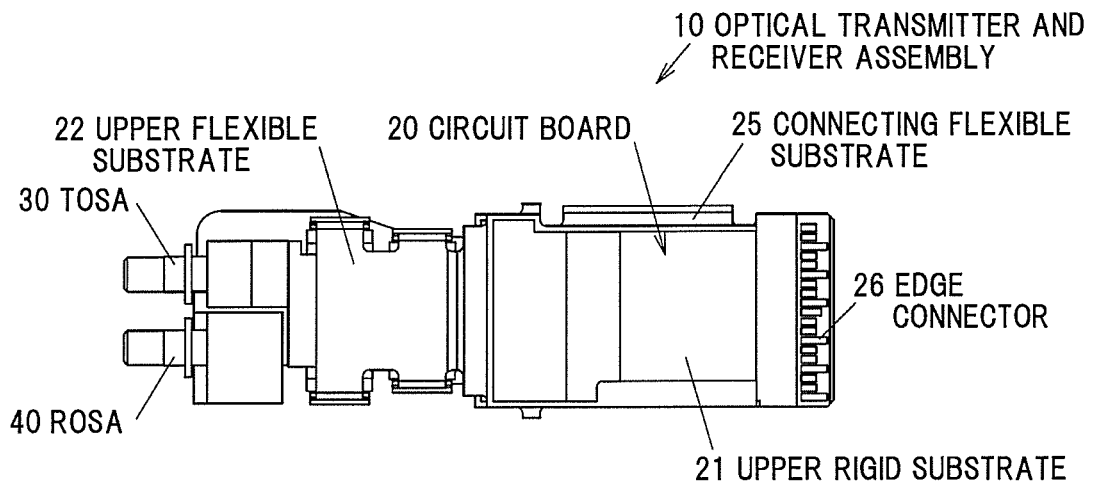
FIG. 4A is a top view showing the optical transmitter and receiver assembly of FIG. 3
Figure 4B:
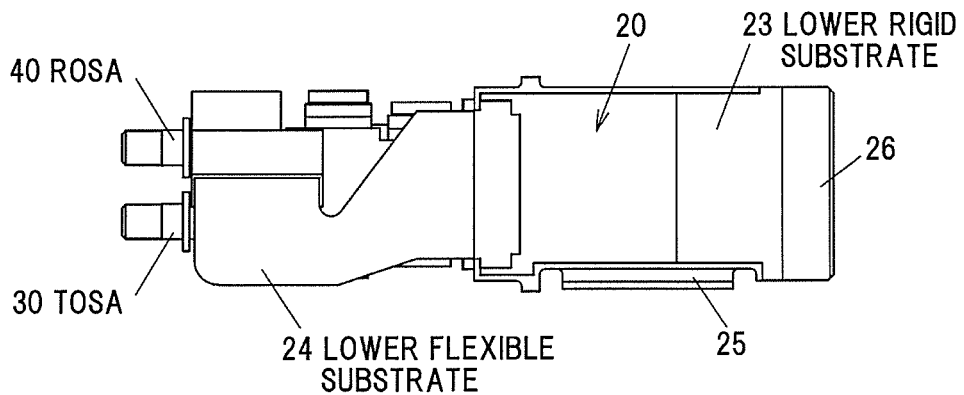
FIG. 4B is a bottom view showing the optical transmitter and receiver assembly of FIG. 3.

FIG. 3 is a perspective view showing an optical transmitter and receiver assembly used for the optical module in the first embodiment of the invention. In addition, FIG. 4A is a top view showing the optical transmitter and receiver assembly of FIG. 3 and FIG. 4B is a bottom view showing the optical transmitter and receiver assembly of FIG. 3.

The optical transmitter and receiver assembly 10 is a four-Wavelength WDM optical transmitter and receiver assembly and is provided with a circuit board 20 and a TOSA 30 and a ROSA 40 which are electrically connected to the circuit board 20.

As shown in FIG. 2, the circuit board 20 is arranged in the housing of the optical module 1 at a distance from the optical adapter 4, and the TOSA 30 and the ROSA 40 are arranged on the optical adapter 4 side.

The circuit board 20 is provided with an edge connector 26 which is of card-edge type attachable to and detachable from an external device and, as shown in FIG. 2, the edge connector 26 is arranged at an end portion of the optical module 1 opposite to the end portion to which the optical adapter 4 is provided.

The circuit board 20 has a two-level structure in which an upper level portion (an upper rigid substrate 21 as a first rigid substrate and an upper flexible substrate 22 as a first flexible substrate) and a lower level portion (a lower rigid substrate 23 as a second rigid substrate and a lower flexible substrate 24 as a second flexible substrate) are connected by a bent connecting flexible substrate 25. The structural details of the circuit board 20 will be described later.

As shown in FIG. 2, in the housing of the optical module 1, the upper rigid substrate 21 and the lower rigid substrate 23 are arranged opposite to the optical adapter 4, and the upper flexible substrate 22 and the lower flexible substrate 24 are arranged on the optical adapter 4 side.

The TOSA 30 is mounted on the upper flexible substrate 22 and is housed in the housing of the optical module 1 in a state of being sandwiched between the upper flexible substrate 22 and the lower flexible substrate 24. The ROSA 40 is mounted on the lower flexible substrate 24.

Structure of the Circuit Board

Figure 5:
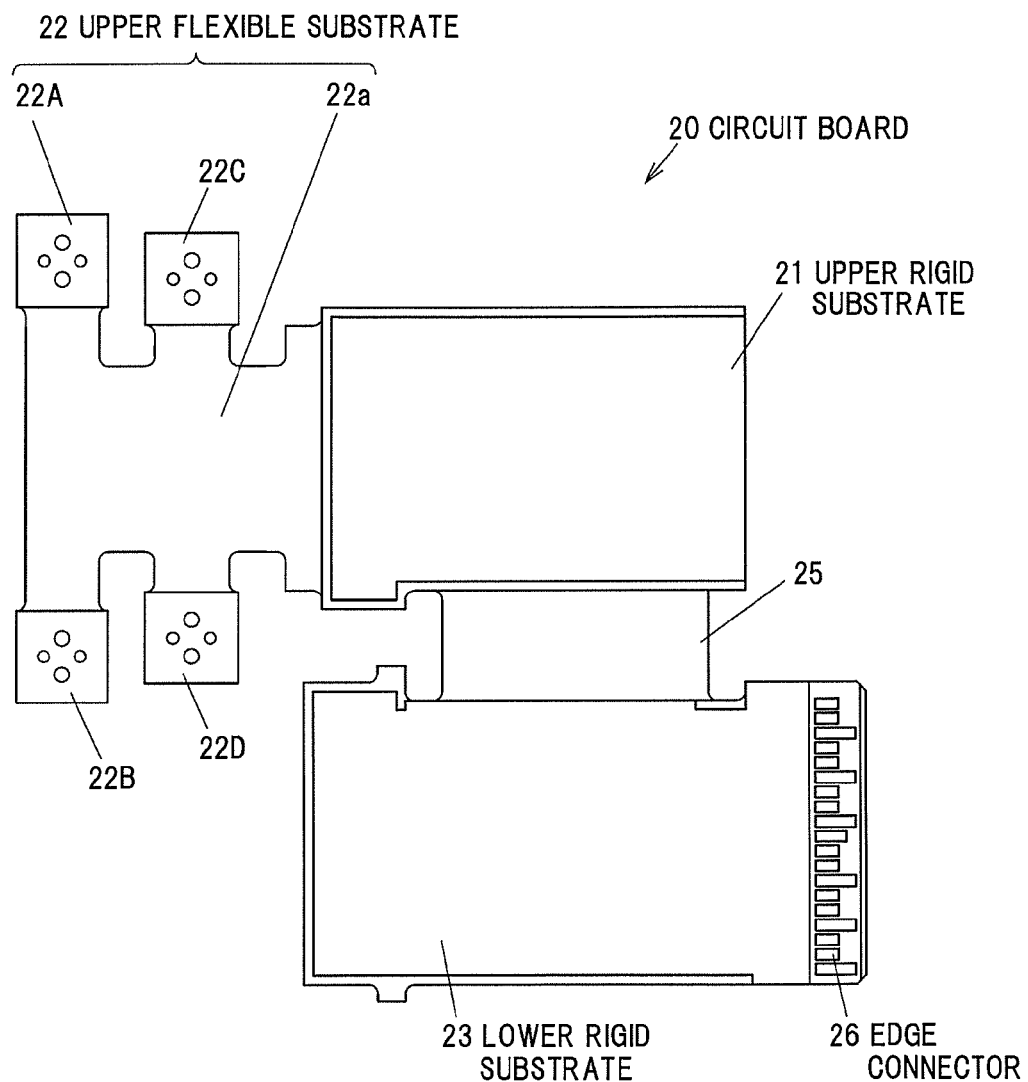
FIG. 5 is a developed view showing a circuit board used for the optical transmitter and receiver assembly of FIG. 3.

FIG. 5 is a developed view showing a circuit board used for the optical transmitter and receiver assembly of FIG. 3.

The circuit board 20 is provided with the upper rigid substrate 21, the upper flexible substrate 22, the lower rigid substrate 23, the lower flexible substrate 24 (shown in FIG. 4 and omitted in FIG. 5), the connecting flexible substrate 25 and the edge connector 26.

The size of the circuit board 20 is adjusted so as to be housed in the upper case 2 and the lower case 3 which are formed in a size conforming to QSFP+ standard.

The upper rigid substrate 21 constitutes the upper level portion of the circuit board and transmission components are mounted and wired on both surfaces thereof.

The upper flexible substrate 22 constitutes, together with the upper rigid substrate 21, the upper level portion of the circuit board. The TOSA 30 is mounted on a lower surface of the upper flexible substrate 22 (an internal surface which faces the lower flexible substrate 24 when the connecting flexible substrate 25 is bent) and the transmission wiring is installed also on the lower surface. An end portion of the upper flexible substrate 22 is connected to an end portion, closer to the optical adapter 4, of the upper rigid substrate 21 so that the upper flexible substrate 22 with the upper rigid substrate 21 arranged side-by-side in a longitudinal direction of the optical module 1 can be housed in the lower case 3.

The upper flexible substrate 22 is provided with a TOSA base facing portion 22a having a surface facing an upper surface of a TOSA base 31 of the TOSA 30 (a TOSA base-facing surface) and four CAN package connection portions 22A to 22D extending outward (toward upper and lower sides in FIG. 5) from the TOSA base facing portion 22a.

The CAN package connection portions 22A and 22B are arranged opposite to each other, and the CAN package connection portions 22C and 22D are also arranged opposite to each other. The CAN package connection portions 22A and 22B are formed longer than the CAN package connection portions 22C and 22D so as to be connected to CAN packages 32A and 32B which are arranged at positions having a longer distance than between CAN packages 32C and 32D.

Four holes for inserting four lead pins 32a of the CAN package are provided on each of the CAN package connection portions 22A to 22D. The CAN package connection portions 22A to 22D are electrically connected to the CAN packages 32A to 32D by being bent substantially 90° and then joined thereto.

Although the four CAN package connection portions 22A to 22D are separately provided, the CAN package connection portions 22A and 22C may be provided integrally and the CAN package connection portions 22B and 22D may be provided integrally as well. In order to increase a degree of freedom of movement, it is preferable to separately provide four CAN package connection portions.

The lower rigid substrate 23 constitutes the lower level portion of the circuit board. Control system components are mounted and wired on an upper surface of the lower rigid substrate 23 (an internal surface which faces the upper rigid substrate 21 when the connecting flexible substrate 25 is bent) and reception components are mounted and wired on a lower surface (an external surface opposite to the internal surface facing the upper rigid substrate 21 when the connecting flexible substrate 25 is bent).

The lower flexible substrate 24 constitutes, together with the lower rigid substrate 23, the lower level portion of the circuit board. The ROSA 40 is mounted on an upper surface of the lower flexible substrate 24 (an internal surface which faces the upper flexible substrate 22 when the connecting flexible substrate 25 is bent) and the receiving wiring is installed also on the upper surface. An end portion of the lower flexible substrate 24 is connected to an end portion, closer to the optical adapter 4, of the lower rigid substrate 23 so that the lower flexible substrate 24 with the lower rigid substrate 23 arranged side-by-side in a longitudinal direction of the optical module 1 can be housed in the lower case 3.

Although it is preferable that the lower flexible substrate 24 be a flexible substrate connected to a lower rigid substrate, the lower flexible substrate 24 may be a rigid substrate as an extension of the lower rigid substrate 23 or a flexible portion extended from the lower rigid substrate 23 as a portion of a rigid-flexible substrate.

The connecting flexible substrate 25 is to connect the upper rigid substrate 21 to the lower rigid substrate 23 at one longitudinal side surface of each substrate, and has transmission wiring formed thereon in the first embodiment.

Structure of TOSA

Figure 6:
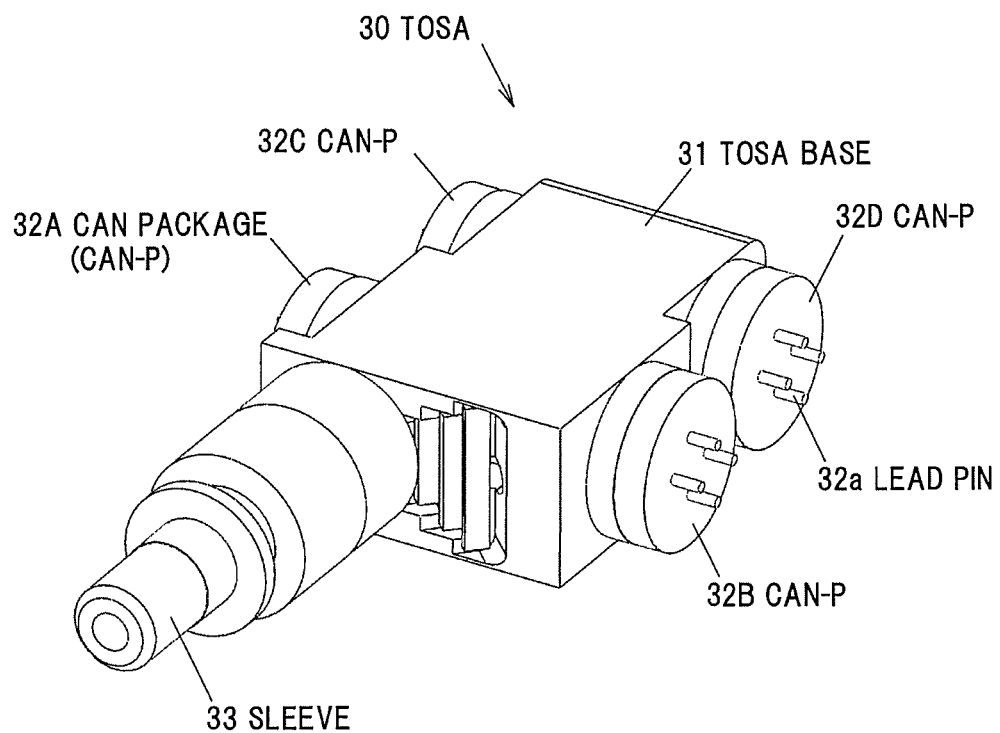
FIG. 6 is a perspective view showing a TOSA used for the optical transmitter and receiver assembly of FIG. 3.
Figure 7:
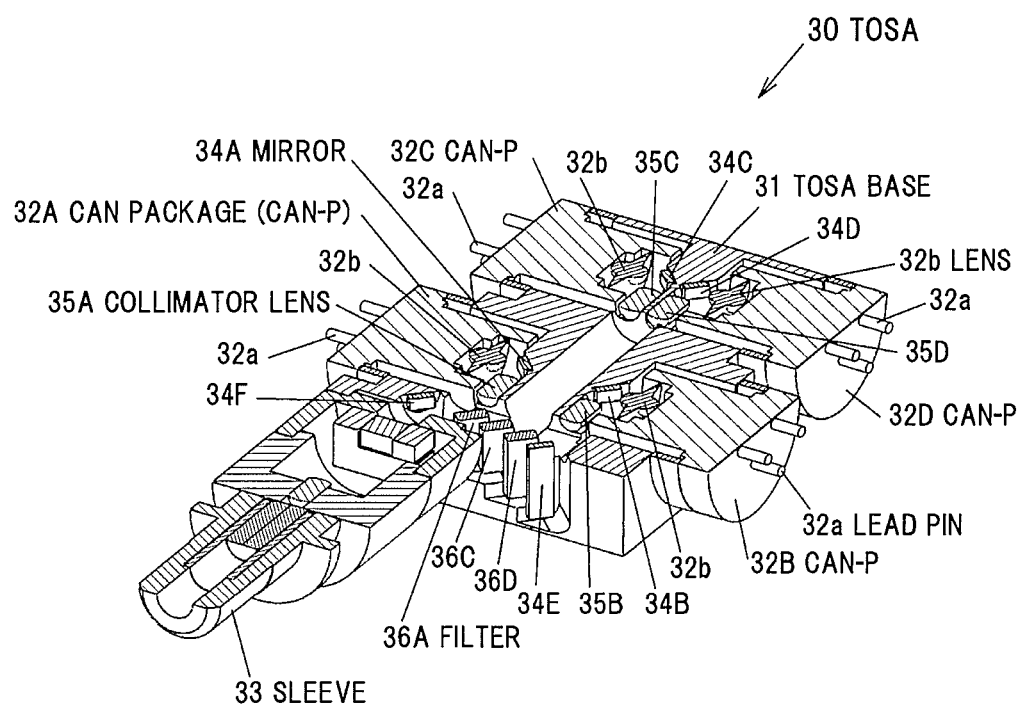
FIG. 7 is a cross sectional view showing the TOSA of FIG. 6.
Figure 8A:
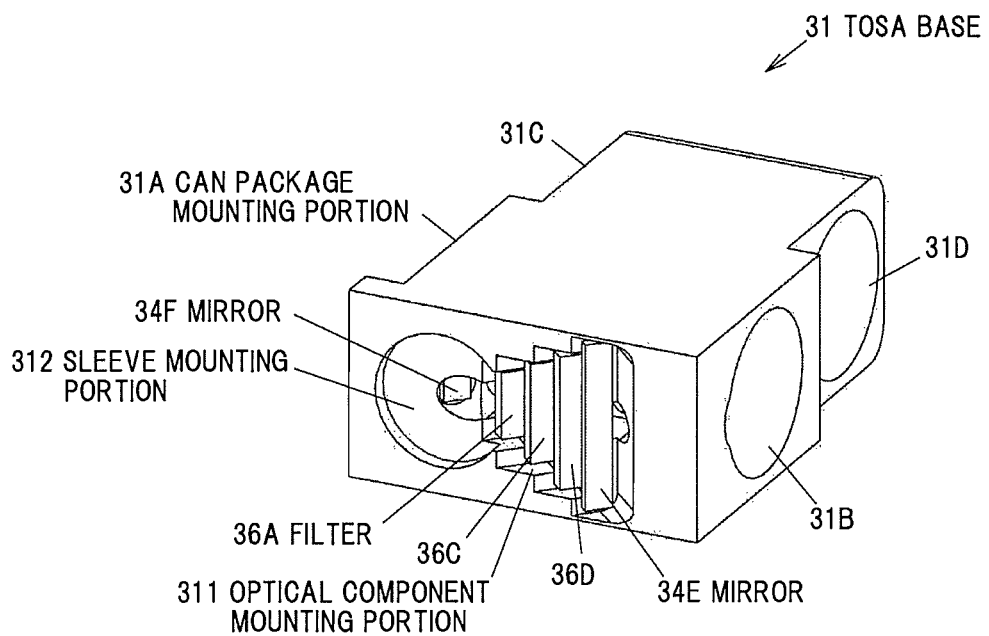
FIG. 8A is a perspective view showing a TOSA base and optical components which constitute the TOSA of FIG. 6
Figure 8B:
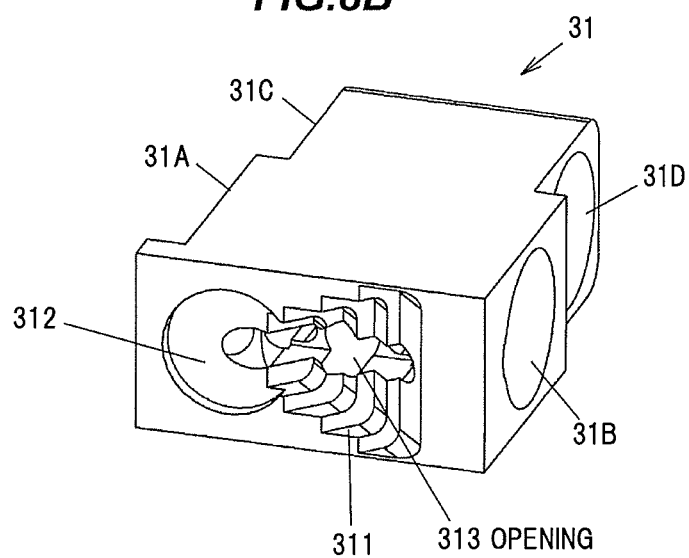
FIG. 8B is a perspective view showing the TOSA base in a state that the optical components are removed from FIG. 8A. In addition.

FIG. 6 is a perspective view showing a TOSA used for the optical transmitter and receiver assembly of FIG. 3. FIG. 7 is a cross sectional view showing the TOSA of FIG. 6. In addition, FIG. 8A is a perspective view showing a TOSA base and optical components which constitute the TOSA of FIG. 6, FIG. 8B is a perspective view showing the TOSA base in a state that the optical components are removed from FIG. 8A, FIG. 8C is a perspective view showing the TOSA base of FIG. 8A as viewed from a different direction and FIG. 8D is a cross-sectional top view showing the TOSA base of FIG. 8A.

The TOSA 30 is provided with the four CAN packages 32A to 32D mounted on four CAN package mounting portions 31A to 31D (circular recessed holes) formed on the TOSA base 31, mirrors 34A to 34D, 34F and collimator lenses 35A to 35D which are mounted inside the TOSA base 31, filters 36A, 36C, 36D and a mirror 34E which are mounted on an optical component mounting portion 311 formed on a light outputting surface (on the optical adapter 4 side) of the TOSA base 31, and a sleeve 33 mounted on a sleeve mounting portion 312 formed on the light outputting surface (on the optical adapter 4 side) of the TOSA base 31.

The size of the TOSA 30 is adjusted so as to be housed in the upper case 2 and the lower case 3 which are formed in a size conforming to QSFP+ standard, while taking into consideration the arrangement space of the circuit board 20.

The TOSA base 31 is formed of, e.g., a metal such as SUS and has a rectangular parallelepiped shape in which both side surfaces are cut into a stairs shape, and the CAN package mounting portions 31A to 31D are formed on the stair portions which are formed by cutting into the stairs shape. The CAN package mounting portions 31A and 31B are oppositely formed so that the CAN packages 32A and 32B are arranged opposite to each other, and the CAN package mounting portions 31C and 31D are oppositely formed so that the CAN packages 32C and 32D are arranged opposite to each other.

The stairs shape is formed by cutting so that stairs are descending toward a side opposite to a light-outputting direction of the TOSA base 31. In other words, a distance between the opposite CAN package mounting portions becomes shorter as separating from the light outputting surface of the TOSA base 31. Accordingly, a distance between the opposite CAN packages becomes shorter as separating from the light outputting surface of the TOSA base 31. In the first embodiment, a distance between the CAN package 32C and 32D is shorter than that between the CAN package 32A and 32B.

The height of the stair is adjusted so that a passage, formed inside the TOSA base 31, of light emitted from each CAN package does not overlap with others. The height is, e.g., 0.5 mm to 1.5 mm.

Although it is preferable that the TOSA base 31 has stairs-shaped side surfaces as described above, it is not limited thereto and the side surfaces may be flat.

Each of the CAN packages 32A to 32D is provided with an LD (laser diode) (illustration omitted) as a light-emitting element for outputting optical signals, the lead pins 32a to be inserted into the holes on the CAN package connection portions 22A to 22D and joined thereto, and a lens 32b for focusing emitted light. It is possible to use commercially available CAN packages as the CAN packages 32A to 32D.

The four CAN packages 32A to 32D are mounted on the CAN package mounting portions 31A to 31D so that the lead pins 32a point to a direction perpendicular to the side surface having the CAN package mounting portion provided thereon and protrude toward the outside of the TOSA base 31.

The mirrors 34A to 34D, 34F and the collimator lenses 35A to 35D, which are optical components, are placed on light passages formed inside the TOSA base 31. The detail will be described later in Explanation of TOSA operation.

Meanwhile, the filters 36A, 36C, 36D and the mirror 34E, which are also optical components, are mounted on the optical component mounting portion 311 in this order from a side closer to the sleeve mounting portion 312. In addition, each optical component (the filters 36A, 36C, 36D and the mirror 34E) is formed such that the length thereof is made shorter as the mounting portion thereof is closer to the sleeve mounting portion 312. These optical components are to constitute an optical multiplexer.

The optical component mounting portion 311 is formed by cutting into a stairs shape. The optical component mounting portion 311 is formed such that the cutting depth (height of the stair) is made deeper as closer to the sleeve mounting portion 312. In addition, the optical component mounting portion 311 is formed such that the cutting width (width of each stair) is made narrower as closer to the sleeve mounting portion 312. By forming the optical component mounting portion 311 into the shape described above, all side edges of each optical component (the filters 36A, 36C, 36D and the mirror 34E) are placed within the step portion.

In addition, an opening 313 to be a passage of light is formed on the optical component mounting portion 311 as shown FIG. 8B. In the passage formed by the opening 313, respective lights emitted from the CAN packages 32A to 32D are multiplexed and are converted into wavelength-multiplexed light.

Figure 9A:
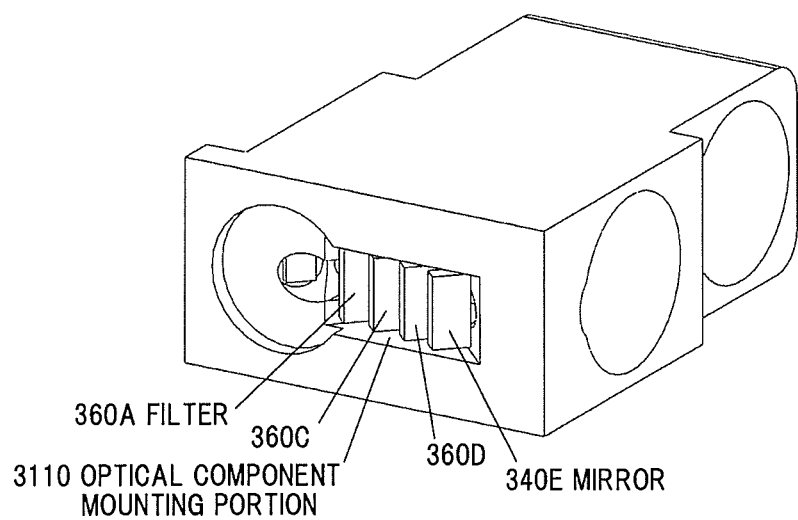
FIG. 9A is a perspective view showing a modification of the TOSA base and the optical components of FIG. 8
Figure 9B:
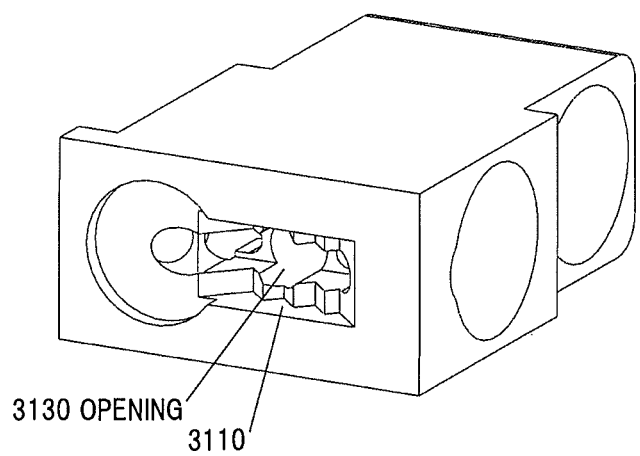
FIG. 9B is a perspective view showing the TOSA base in a state that the optical components are removed from FIG. 9A.

FIG. 9A is a perspective view showing a modification of the TOSA base and the optical components of FIG. 8 and FIG. 9B is a perspective view showing the TOSA base in a state that the optical components are removed from FIG. 9A.

Unlike the case shown in FIG. 8, each optical component (filters 360A, 360B, 360C and a mirror 340E) in the modification shown in FIGS. 9A and 9B is not formed such that the length thereof is made shorter as the mounting portion thereof is closer to the sleeve mounting portion 312, and all lengths are the same. In addition, an optical component mounting portion 3110 is not formed such that the cutting depth (height of the stair) is made deeper as closer to the sleeve mounting portion 312, and all depths are the same. Furthermore, the optical component mounting portion 3110 is not formed such that the cutting width (width of each stair) is made narrower as closer to the sleeve mounting portion 312, and all widths are the same.

Although the modification shown in FIGS. 9A and 9B can be adopted in the first embodiment, the form shown in FIGS. 8A to 8D is preferable since, in the modification, it is not possible to place all side edges of each optical component (the filters 360A, 360C, 360D and the mirror 340E) within the step portion and only part of the side edges is placed within the step portion, which results in that the filters may lean and it is not easy to stably mount the optical components.

The sleeve 33 is optically connected to an optical connector which is inserted into TX of the optical adapter 4.

Explanation of TOSA Operation

Figure 10:
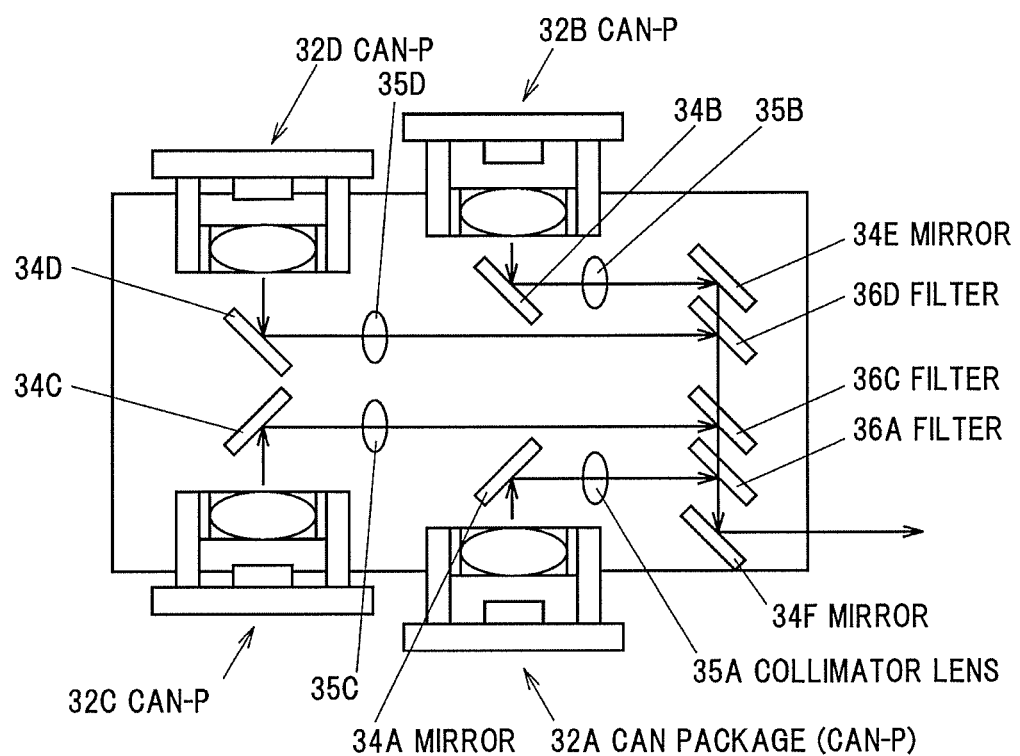
FIG. 10 is an explanatory diagram illustrating structure and operation of the TOSA used for the optical module in the first embodiment of the invention.

FIG. 10 is an explanatory diagram illustrating structure and operation of the TOSA used for the optical module in the first embodiment of the invention.

As shown in FIG. 10 in which paths of lights emitted from the respective CAN packages are indicated by arrows, a passage of light is formed inside the TOSA base 31 along the paths.

The paths of lights will be specifically described below.

The light emitted from the CAN package 32A is reflected by the mirror 34A to change the direction, is converted into parallel light by passing through the collimator lens 35A placed on the light passage, is reflected by the filter 36A to change the direction again and travels toward the mirror 34F.

The light emitted from the CAN package 32C is reflected by the mirror 34C to change the direction, is converted into parallel light by passing through the collimator lens 35C placed on the light passage, is reflected by the filter 36C to change the direction again, is transmitted through the filter 36A and travels toward the mirror 34F.

The light emitted from the CAN package 32D is reflected by the mirror 34D to change the direction, is converted into parallel light by passing through the collimator lens 35D placed on the light passage, is reflected by the filter 36D to change the direction again, is transmitted through the filters 36C and 36A, and travels toward the mirror 34F.

The light emitted from the CAN package 32B is reflected by the mirror 34B to change the direction, is converted into parallel light by passing through the collimator lens 35B placed on the light passage, is reflected by the mirror 34E to change the direction again, is transmitted through the filters 36D, 36C and 36A, and travels toward the mirror 34F.

Respective optical signals emitted from the CAN packages 32A to 32D pass through different light passages until reaching the optical components mounted on the optical component mounting portion 311, as shown in FIG. 10.

Four wavelengths are multiplexed between the filter 36D and the mirror 34F and are converted into wavelength-multiplexed light, and the wavelength-multiplexed light is reflected by the mirror 34F to change the direction and is emitted through the sleeve 33.

The light passage until reaching the optical components mounted on the optical component mounting portion 311 can be shared by using a filter instead of the mirrors 34A and 34B. However, it is preferable to form the light passages so that each optical signal passes through a different light passage until reaching the optical component mounted on the optical component mounting portion 311 as described above since filters requiring positioning accuracy can be mounted all together only on the optical component mounting portion 311 of the light outputting surface, which facilitates a cutting process and enhances positioning accuracy.

Structure of ROSA

It is possible to use a known ROSA for the ROSA 40.

Effects of the First Embodiment of the Invention

The first embodiment achieves the following effects.

(1) It is possible to provide an optical module having a structure which allows high-density packaging even in a WDM compact optical transceiver, e.g., one conforming to QSFP+ standard.

(2) Since the TOSA is not arranged between the rigid substrates but is mounted on the flexible substrate (e.g., 0.2 mm) which is thinner than the rigid substrate (e.g., 1.0 mm), it is possible to downsize in a thickness direction or the size of the TOSA can be increased. In addition, since the rigid substrate can have a horizontally and vertically wide area, a degree of freedom of component arrangement increases and wiring efficiency is also good. In addition, since it is possible to reduce narrow-pitch wiring especially on a card edge, it is possible to reduce the effect of crosstalk.

(3) Since it is possible to separate transmitting side high-speed wirings (on both surfaces of the upper rigid substrate) from a receiving side high-speed wiring (on a lower surface (a surface not facing the upper rigid substrate) of the lower rigid substrate), it is possible to reduce the effect of crosstalk.

(4) By bending the upper flexible substrate at a portion connected to the upper rigid substrate, it is possible to adjust the height according to the size of the TOSA.

(5) Since it is configured that the CAN packages are oppositely arranged in a stairs shape on the TOSA base, compact component layout is possible. In addition, since the filters can be mounted all together only on the optical component mounting portion of the light outputting surface, the cutting process is facilitated and positioning accuracy is enhanced. In addition, it is possible to narrow a mounting interval of filters, which allows downsizing.

(6) Since it is configured that the CAN packages are oppositely arranged on the TOSA base, it is possible to shorten a length of the transmitting side high-speed wiring.

Second Embodiment of the Invention

Figure 11:
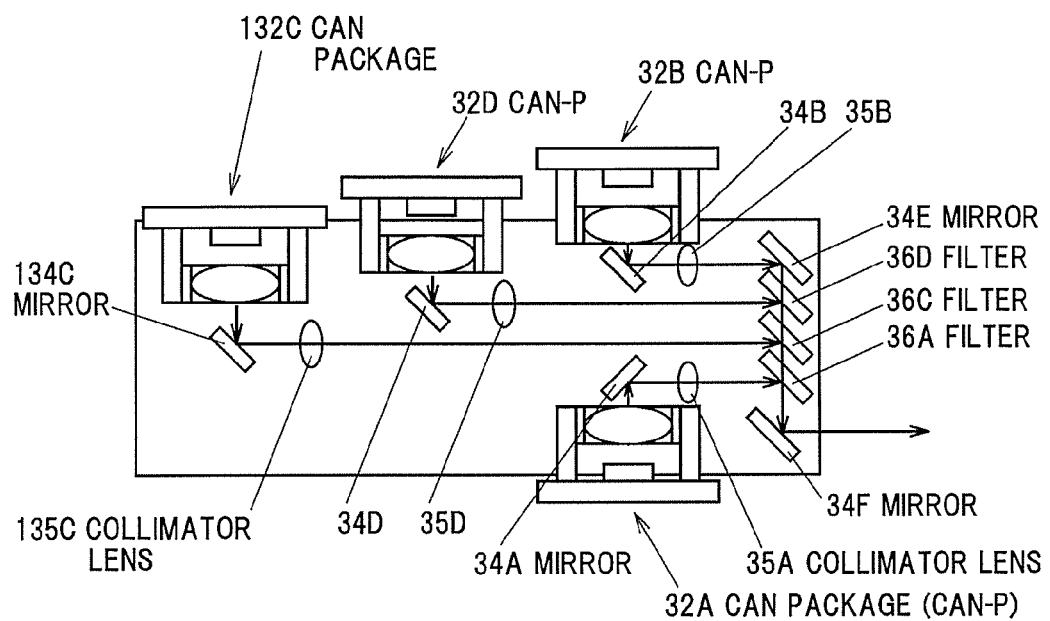
FIG. 11 is an explanatory diagram illustrating structure and operation of a TOSA used for an optical module in a second embodiment of the invention.

FIG. 11 is an explanatory diagram illustrating structure and operation of a TOSA used for an optical module in a second embodiment of the invention.

In the optical module in the second embodiment of the invention, the TOSA and the circuit board have configurations different from those in the optical module in the first embodiment.

That is, the second embodiment of the invention is different from the first embodiment in that one more stair is added on the side surface on a side of the CAN packages 32B and 32D and a CAN package 132C is mounted thereon instead of providing the CAN package 32C which is, in FIG. 10, mounted on the same side as the CAN package 32A in a stairs manner. In addition, the shape of the upper flexible substrate 22 is changed according to the change in the shape of the TOSA base and the installation position of the CAN package. Furthermore, in accordance with the change in the installation position of the CAN package, the installation positions of the mirror 34C and the collimator lens 35C are also changed to positions where a mirror 134C and a collimator lens 135C are located in FIG. 11.

Since the operation is the same as that in the first embodiment, the explanation thereof will be omitted.

Effects of the Second Embodiment of the Invention

The second embodiment achieves the same effects as the first embodiment as well as the following effects.

(1) Since it is not necessary to change the installation positions of the filters even if the position of the light source (CAN package) is changed, degree of freedom of arranging the light sources increases. In addition, it is possible to optimally and freely change the shape of the TOSA base.

The first embodiment employing the two-opposite-two arrangement is more preferable than the second embodiment in that the optical module can be smaller.

Third Embodiment of the Invention

Figure 12:
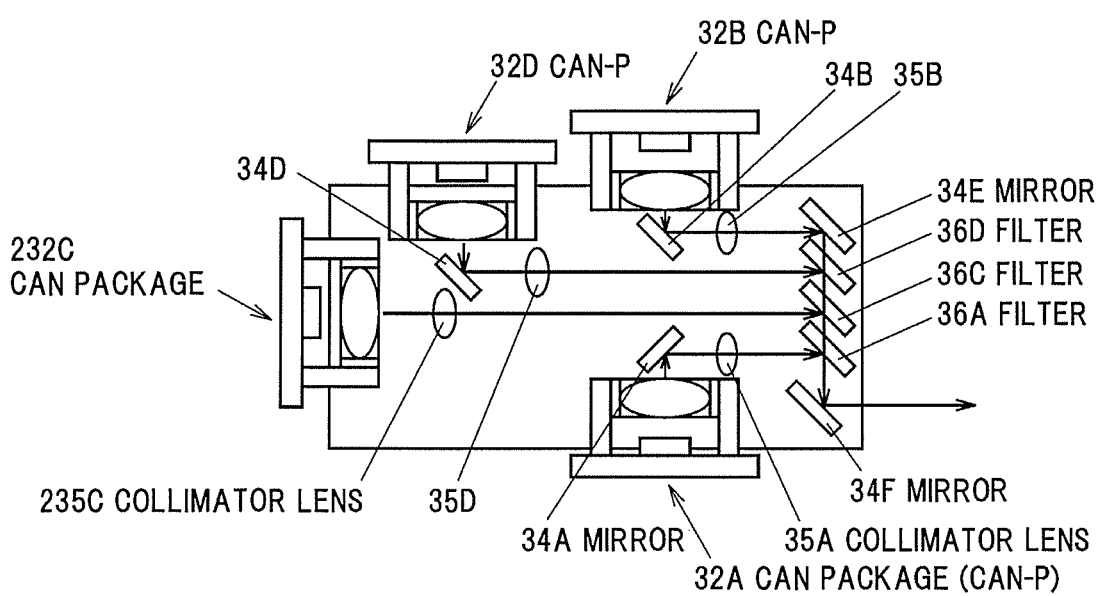
FIG. 12 is an explanatory diagram illustrating structure and operation of a TOSA used for an optical module in a third embodiment of the invention.

FIG. 12 is an explanatory diagram illustrating structure and operation of a TOSA used for an optical module in a third embodiment of the invention.

In the optical module in the third embodiment of the invention, the TOSA and the circuit board have configurations different from those in the optical module in the first embodiment.

That is, the third embodiment of the invention is different from the first embodiment in that a CAN package 232C is mounted on a surface opposite to the light outputting surface instead of providing the CAN package 32C which is, in FIG. 10, mounted on the same side as the CAN package 32A in a stairs manner. In addition, the shape of the upper flexible substrate 22 is changed according to the change in the shape of the TOSA base and the installation position of the CAN package. Furthermore, there is no need to provide the mirror 34C and, in accordance with the change in the installation position of the CAN package, the installation position of the collimator lens 35C is also changed to a position where a collimator lens 235C is located in FIG. 12.

Since the operation is the same as that in the first embodiment, the explanation thereof will be omitted.

Effects of the Third Embodiment of the Invention

The third embodiment achieves the same effects as the first embodiment as well as the following effects.

(1) Since it is not necessary to change the installation positions of the filters even if the position of the light source (CAN package) is changed, degree of freedom of arranging the light sources increases. In addition, it is possible to optimally and freely change the shape of the TOSA base.

The first embodiment employing the two-opposite-two arrangement is more preferable than the third embodiment in that the optical module can be smaller.

Although the embodiments of the invention have been described, the invention is not intended to be limited to the embodiments, and the various kinds of modifications can be implemented without departing from the gist of the invention.

What is claimed is:

1. An optical module, comprising:
a housing;
an optical adapter attached to an end portion of the housing; and
an optical transmitter and receiver assembly mounted in the housing,
wherein the optical transmitter and receiver assembly comprises a TOSA comprising a plurality of light-emitting elements for outputting optical signals, a ROSA comprising a light-receiving element for inputting optical signals, and a circuit board electrically connected to the TOSA and the ROSA,
wherein the TOSA further comprises a TOSA base arranged in an optical adapter side of the housing, the TOSA base including two side surfaces opposite and parallel to each other, the plurality of light-emitting elements being installed on the two parallel side surfaces respectively so that optical paths of light emitted from the plurality of light-emitting elements are parallel to each other,
wherein the circuit board comprises a first flexible substrate, which is mounted with the TOSA, and a first rigid substrate, which is coupled to the first flexible substrate, and
wherein the first flexible substrate comprises a TOSA base-facing portion, which is opposite the TOSA base, and a plurality of joining portions, which extend from both ends, respectively, of the TOSA base-facing portion and which are joined to the plurality of light-emitting elements respectively, wherein the plurality of joining portions comprise a first joining portion, which is joined to the light-emitting elements arranged on one of the two side surfaces, and a second joining portion, which is joined to the light-emitting elements arranged on another of the two side surfaces, wherein the first joining portion and the second joining portion extend from the TOSA base-facing portion, in directions opposite and parallel to each other.

2. The optical module according to claim 1, wherein the circuit board has a two-level structure such that an upper level portion comprises the first flexible substrate and the first rigid substrate, and a lower level portion comprises a second rigid substrate that is connected to the first rigid substrate via a connecting flexible substrate.

3. The optical module according to claim 2, wherein a transmission component is arranged and wired on the first rigid substrate and a reception component is arranged and wired on the second rigid substrate.

4. The optical module according to claim 2, wherein the second flexible substrate mounting the ROSA is connected to the second rigid substrate.

5. The optical module according to claim 2, wherein the second rigid substrate comprises an edge connector at an end portion thereof.

6. The optical module according to claim 1, wherein the plurality of light-emitting elements are arranged on the TOSA base while being each housed in a CAN package.

7. An optical module, comprising:
a housing;
an optical adapter attached to an end portion of the housing; and
an optical transmitter and receiver assembly mounted in the housing,
wherein the optical transmitter and receiver assembly comprises a TOSA comprising a plurality of light-emitting elements for outputting optical signals, a ROSA comprising a light-receiving element for inputting optical signals, and a circuit board electrically connected to the TOSA and the ROSA, wherein the TOSA is disposed on a side of the optical adapter in the housing and further comprises a TOSA base having opposing side surfaces on which the plurality of light-emitting elements are oppositely arranged so as to form at least one pair, wherein the circuit board comprises a first flexible substrate mounting the TOSA and a first rigid substrate connected to the first flexible substrate, wherein the first flexible substrate comprises a TOSA base facing-portion facing the TOSA base, and a connection portion extending from both end portions of the TOSA base-facing portion and connected to the plurality of light-emitting elements, and wherein the TOSA base has a side surface formed into a stairs shape and the light-emitting element is placed on each stair.

* * * * *